May 14, 1940.     S. E. ANDERSON     2,200,685
COMBINATION ACCELERATOR AND BRAKE CONTROL
Filed Jan. 16, 1939     4 Sheets-Sheet 3
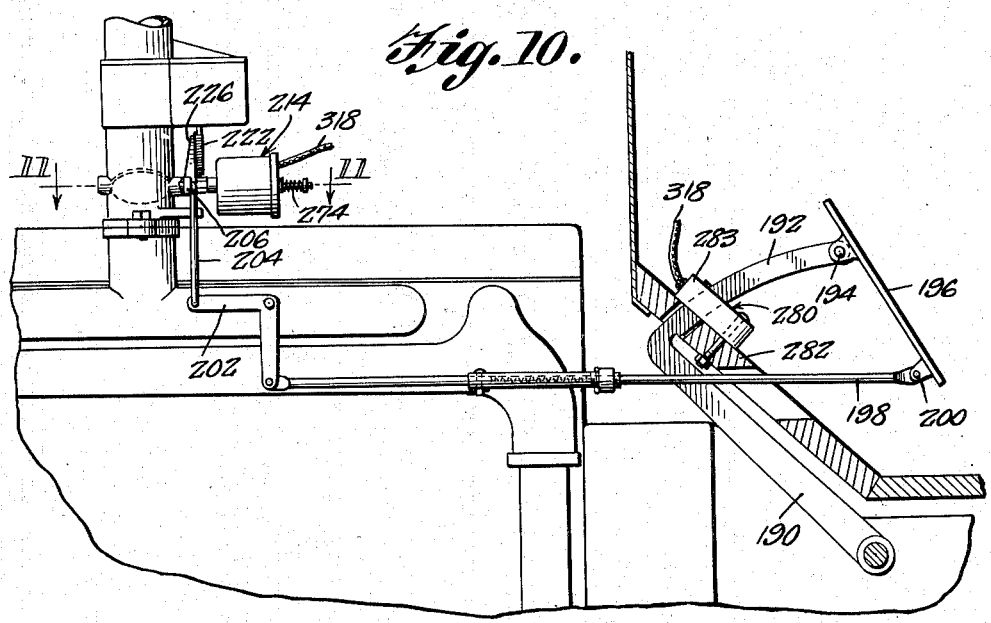
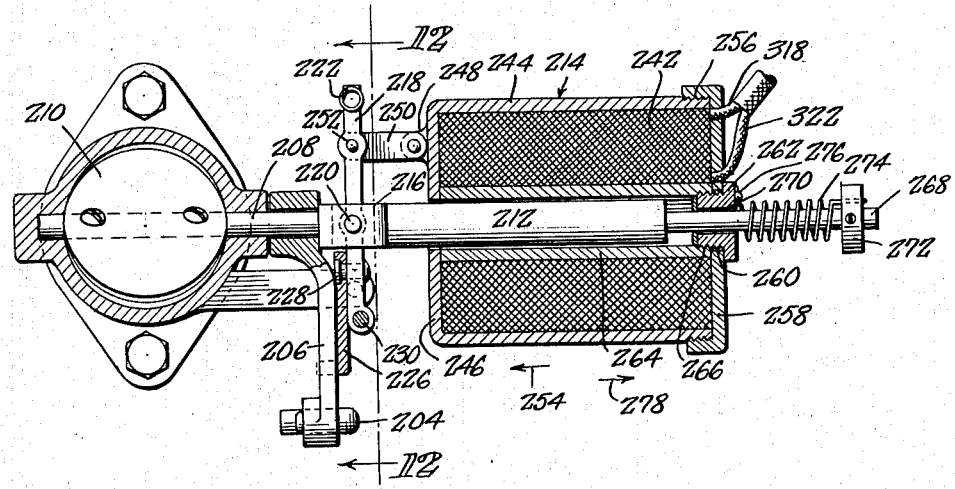

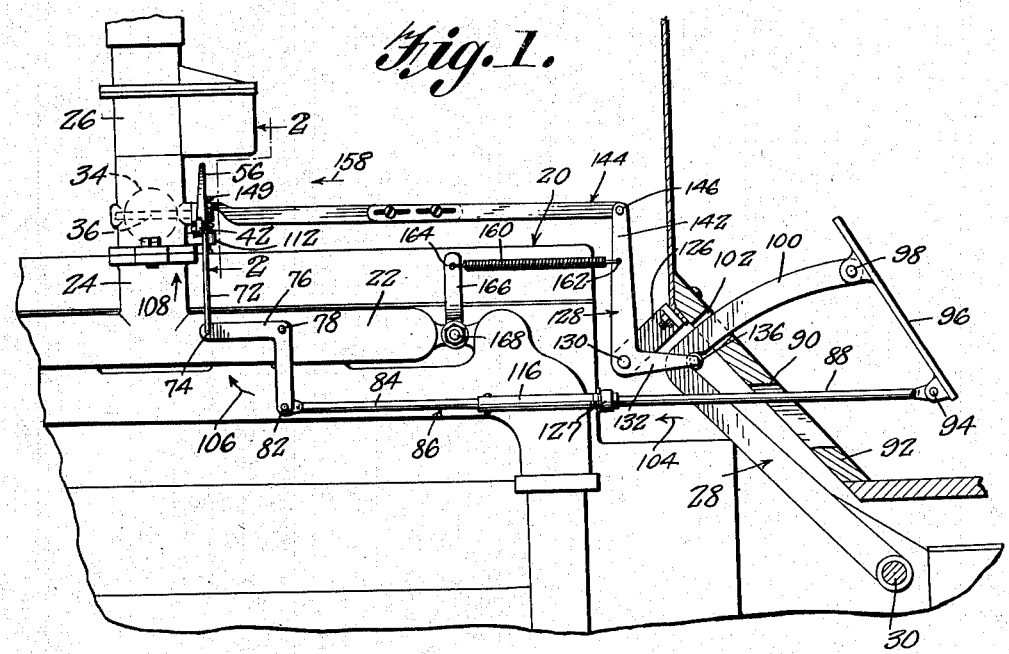

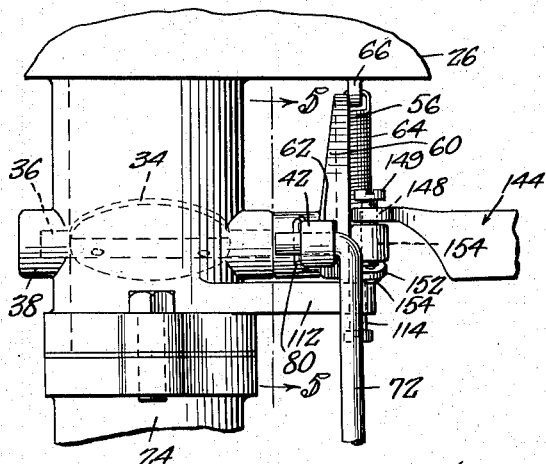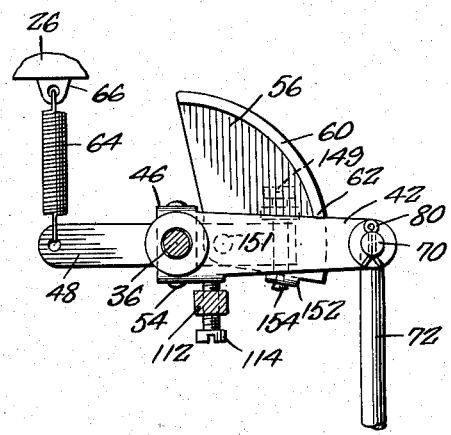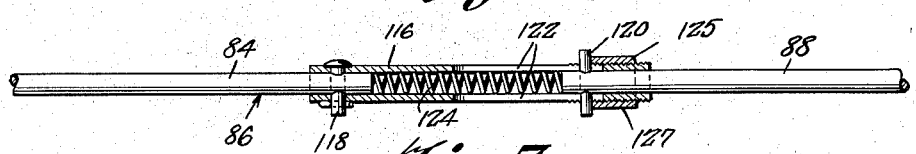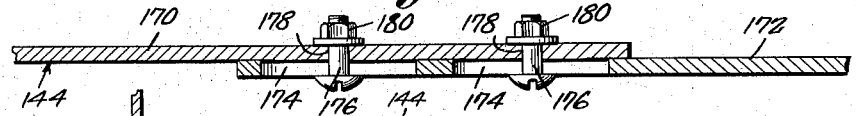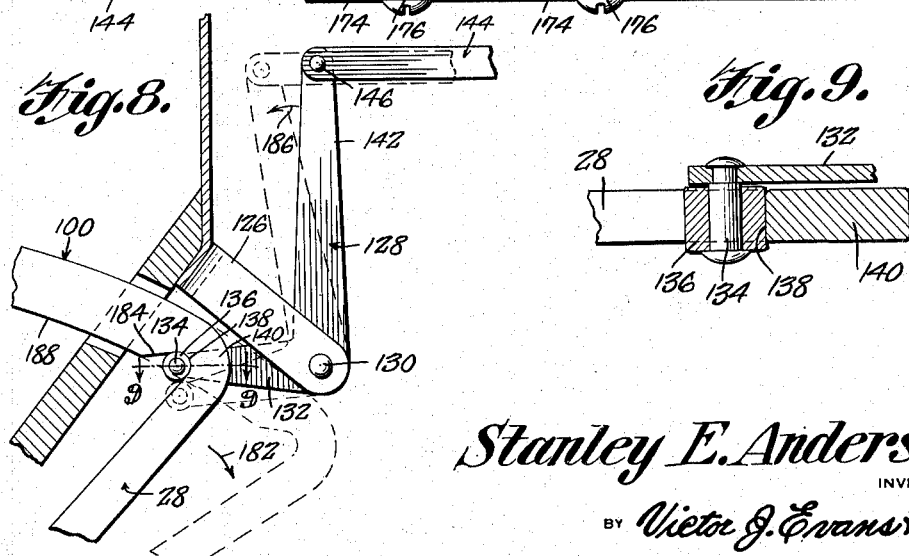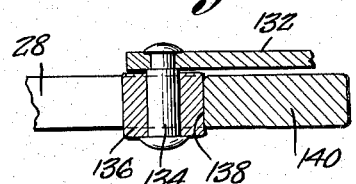

May 14, 1940.　　　S. E. ANDERSON　　　2,200,685
COMBINATION ACCELERATOR AND BRAKE CONTROL
Filed Jan. 16, 1939　　　4 Sheets-Sheet 4
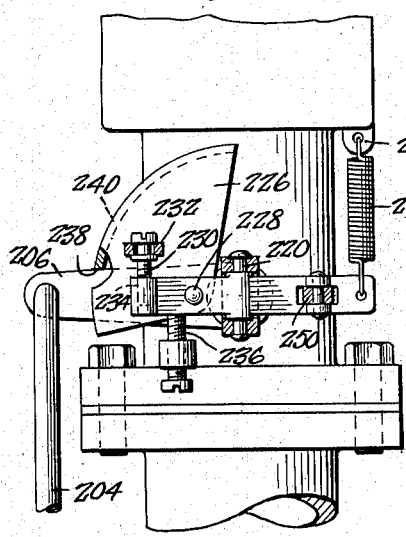
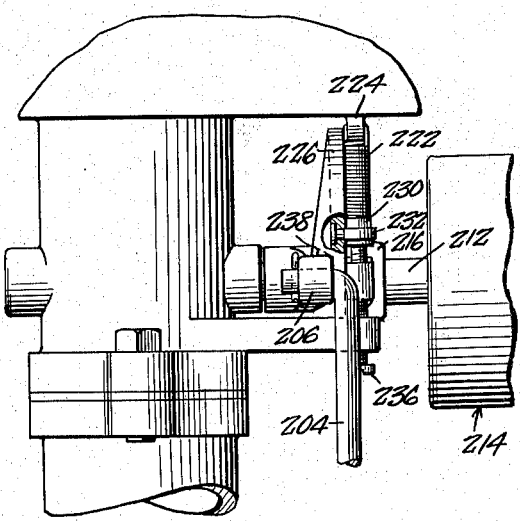
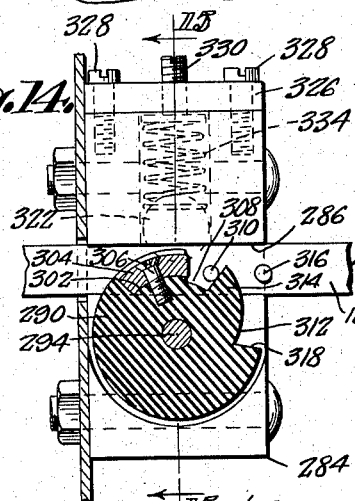
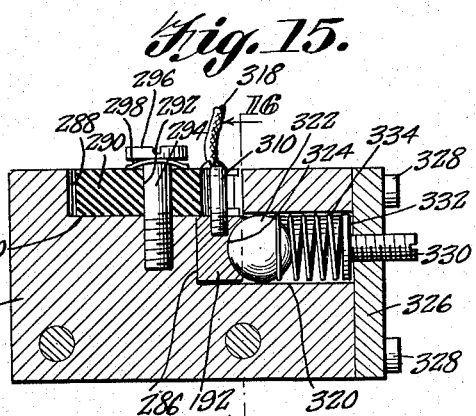
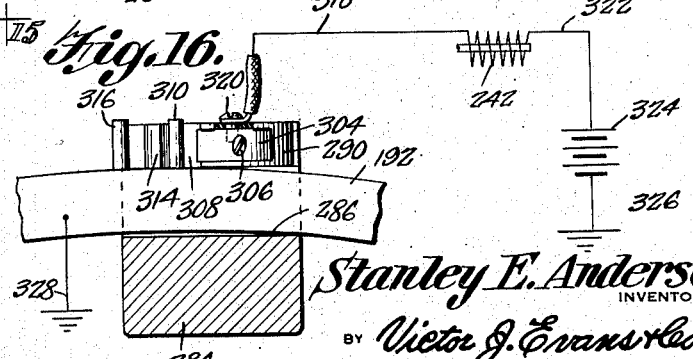

Patented May 14, 1940

2,200,685

UNITED STATES PATENT OFFICE 2,200,685

COMBINATION ACCELERATOR AND BRAKE CONTROL

Stanley E. Anderson, Superior, Wis.

Application January 16, 1939, Serial No. 251,247

8 Claims. (Cl. 192—3)

My invention relates to internal combustion engines, and has among its objects and advantages the provision of an improved combination accelerator and brake controlling mechanism.

My invention relates particularly to a pedal as an instrumentality for use in association with means for operating valve controlled and brake applying devices. The pedal is so related to its associated operating elements of such devices as to permit positive, proper and accurate control thereof. In the instant case, the invention is illustrated in association with the controlling means for accelerators and brakes of motor driven vehicles, such as automobiles. While the invention is illustrated in connection with the control and operation of an accelerator and a conventional brake lever, I wish it to be understood that the invention is not limited in its application, but may be employed for other use to which it may be found applicable without departing from the spirit of the invention.

The principal object of the present invention is to provide a unitary device for controlling the accelerator and brake without necessitating a separate instrumentality for each, as is common practice in the art. My invention is so designed as to be applicable to conventional accelerator and brake operating devices without necessitating material changes in the basic structure thereof.

In the accompanying drawings:

Figure 1 is an elevational view of a portion of an internal combustion engine illustrating my invention applied to the accelerator and brake lever thereof;

Figure 2 is an enlarged view taken from the position indicated by line 2—2 of Figure 1;

Figure 3 is a sectional view along the line 3—3 of Figure 2;

Figure 4 is an enlarged elevational view of the accelerator or throttle valve illustrated in Figure 1;

Figure 5 is a sectional view along the line 5—5 of Figure 4;

Figure 6 is a view illustrating the yieldable connection between the pedal and the throttle valve;

Figure 7 is a fragmentary sectional view of the adjustable link constituting a part of the operating connection between the brake lever and the accelerator mechanism;

Figure 8 is an enlarged view of a portion of the brake pedal illustrating the operation of one of the connections between the brake lever and the accelerator mechanism;

Figure 9 is an enlarged sectional view along the line 9—9 of Figure 8;

Figure 10 is a view similar to Figure 1 but illustrating the manner in which electrically controlled means may be associated with the brake lever for breaking the accelerator linkage when the brake is applied;

Figure 11 is an enlarged sectional view along the line 11—11 of Figure 10;

Figure 12 is a view taken from the position indicated by line 12—12 of Figure 11;

Figure 13 is a view similar to Figure 12, but illustrating the structure rotated 90 degrees;

Figure 14 is a sectional view of the brake lever operated switch;

Figure 15 is a sectional view along the line 15—15 of Figure 14; and

Figure 16 is a sectional view along the line 16—16 of Figure 15 in combination with the electric circuit.

In the embodiment selected to illustrate my invention, I make use of an internal combustion engine, a portion of which is indicated at 20 in Fig. 1. The engine 20 includes the usual intake manifold 22 in association with the conduit 24 operatively related to the carburetor 26. Fig. 1 illustrates a conventional brake lever 28 which may be pivoted about the usual axis 30 for application of the brakes associated with the vehicle. A spring 32 yieldingly supports the brake lever 28 in its normal position.

Conduit 24 is provided with the usual throttle valve 34, see Fig. 3. Valve 34 is fixedly connected with a shaft 36 having one end rotably journaled in the boss 38 and its opposite end extending through a diametrically opposed boss 40 to serve as a pivot for an arm 42 which is provided with a bored head 44 for loosely receiving the shaft 36.

The outer end of the shaft 36 is fashioned to provide spaced and parallel flanges 46 between which I position a latch lever 48. Intermediate the ends of the latch lever 48 I provide a bore 50 to loosely receive a pin 52 constituting a pivot for the latch lever. Pin 52 is extended through aligned openings in the flanges 46, and the ends of the pin are upset, as at 54, for anchoring the pin. Thus the latch lever 48 may be pivoted about an axis at right angles to the axis of the shaft 36, but the latch lever may be rotated with the shaft as a unit.

To the latch lever 48 I connect a latch segment 56, which comprises a plate fashioned to provide a right angularly disposed flange 60 of curved configuration, with the curvature concentrically arranged with respect to the axis of the shaft 36. Figs. 2 and 3 illustrate the normal relation between the latch segment 56 and the arm 42, at which time the end 62 of the flange 60 extends across the upper edge of the arm 42.

To the end of the latch lever 48 opposite the latch segment 56 I connect one end of a tension spring 64. The opposite end of the tension spring 64 is connected with a lug 66. Thus the spring 64 urges the end 62 of the flange 60 against the arm 42, the outer end of which arm is bored at 68 for pivotal connection with the right angular bend 70 of a rod 72 pivotally connected at 74 with one end of a bell crank 76 pivotally mounted at 78 upon the intake manifold 22. A cotter pin 80 passes through an opening in the right angular bend 70 and holds the latter in connected relation with the arm 42.

To the opposite end of the bell crank 76 I pivotally connect at 82 the section 84 of an operating linkage 86. Section 88 of the linkage 86 extends through an opening 90 in the foot board 92 and is pivotally connected at 94 with the lower end of a pedal 96 pivotally connected near its other end at 98 with the reach 100 of the brake lever 28. Reach 100 extends through an opening 102 in the foot board 92.

Pressure on the lower margin of the pedal 96 moves the linkage 86 in the direction of the arrow 104 for pivoting the bell crank 76 in the direction of the arrow 106. Such pivotal action of the bell crank 76 moves the rod 72 in the direction of the arrow 108. Under normal operating conditions, the end 62 of the latch segment 56 extends across the arm 42 so that upward movement of the rod 72 will move the segment 56 in the direction of the arrow 110. Since the end 62 lies in abutting relation with the arm 42, movement of the latch segment 56 in the direction of the arrow 110 will rotate the shaft 36 in the same direction for moving the valve 34 to an opening position.

Release of pressure on the pedal 96 for valve opening purposes will permit the spring 64 to function for moving the valve 34 toward its closing position. It will thus be seen that the latch segment 56, in combination with its flange 60, constitutes an operating connection between the arm 42 and the latch lever 48 for operating the valve 34. Fig. 2 illustrates a lug 112 as being carried by the conduit 24 and provided with an adjustable screw 114 arranged in the path of the lower flange 46 to constitute a stop for the valve 34 when moved to its closed position.

Fig. 6 illustrates the section 84 of the operating linkage 86 as being positioned inside a tube 116 and keyed thereto by means of a pin 118 extending through aligned openings in the sleeve and the section 84. Section 88 has one end slidably disposed inside the tube 116 and is provided with a pin 120 which extends through slots 122 in the tube 116. Between the ends of the sections 84 and 88 I interpose a compression spring 124. I thread the tube 116 at 125 for connection with an adjustable collar 127 arranged to act as a stop for the pin 120.

Referring to Figs. 1 and 8, I anchor a bracket 126 to the foot board 92, and to the lower end of the bracket I pivotally connect a bell crank 128, as at 130. The reach 132 of the bell crank is provided with a right angular shaft element 134 upon which I rotatably mount a sleeve 136 which normally lies in the notch 138 inside the bend 140 of the brake lever 28.

The opposite end of the link 144 is bored at 148 for loosely receiving a screw 149 threaded into the bore 150 in one end of the latch lever 48. A rivet 151 pivotally connects the segment 56 with the latch lever 48, and the segment is provided with a right angular flange 152 bored for loosely receiving the neck 153 formed on the lower end of the screw 149. The head 154 of the screw lies underneath the flange 152 so that the neck 153 constitutes a swivel connection with the flange. Thus the segment 56 may be adjusted relatively to the latch lever 48 about the rivet 151 as an axis through adjustment of the screw 149 for compensating wear as well as facilitating precise adjustment of the parts.

Link 144 is urged in the direction of the arrow 158 through the medium of a tension spring 160 having one end connected at 162 with the reach 142 of the bell crank 128 and its opposite end connected at 164 with a bracket 166 bolted at 168 to the engine. In Fig. 7, I illustrate the link 144 as being made up of sections 170 and 172 arranged partly in overlapping relation. Section 172 is slotted at 174 for the reception of bolts 176 extending through openings 178 in the section 170. Thus tightening of nuts 180 will firmly clamp the overlapping parts of the sections into a unitary structure. Slots 174 permit relative adjustment of the sections 170 and 172 so as to secure the most advantageous overall length of the link 144.

Fig. 8 illustrates the action of the bell crank 128 when the brake lever 28 is manipulated for brake applying purposes. A slight movement of the brake lever 28 in the direction of the arrow 182 moves the camming edge 184 into pressure relation with the sleeve 136 for pivoting the bell crank 128 in the direction of the arrow 186. Fig. 8 illustrates the maximum shifted position of the bell crank 128 in dotted lines. Camming edge 184 shifts the bell crank 128 its full distance, after which the edge 188 of the reach 100 supports the bell crank in the position.

Movement of the bell crank 128 from the full to the dotted line position of Fig. 8 exerts a pull on the link 144 and moves it sufficiently far to pivot the latch lever 48 to its dotted line position of Fig. 3, at which time the end 62 of the flange 60 is entirely in the clear of the arm 42. With the end 62 in the clear of the arm 42, the spring 64 maintains the valve in a closed position, notwithstanding the fact that the bell crank 76 might be pivoted a considerable distance in the direction of the arrow 106 with consequent elevation of the arm 42 about the shaft 36 as an axis.

Flange 60 is of such length as to lie across the side face of the arm 42 regardless of the degree to which the arm might be pivoted in an upward direction when viewing Fig. 2. Thus the arm 42 will move freely relatively to the latch segment 56 to facilitate readjustment of the arm 42 and the latch segment 56 to their relative positions of Fig. 2. It will thus be seen that deceleration is automatically effected immediately upon initiation of brake application through the medium of the brake lever 28. A slight movement of the brake lever 28 effects disconnection of the latch segment 56 from the arm 42.

Release of the brake lever 28 will permit its return to the normal position of Fig. 1, at which time the sleeve 136 will move into the notch 138 and positively return the bell crank 128 to the full arm positions of Figs. 1 and 8 through the medium of the tension spring 160. End 62 is then shifted back across the arm 42 so as to again bring the arm 42 and the latch segment 56 into connected relation so that the valve 34 may be controlled through manipulation of the pedal 96.

In operation, arm 42 is effectively connected with the latch arm 48 for acceleration purposes.

After the valve 34 has been moved to its full open position, further travel of the pedal 96 compresses the spring 124 in the linkage 86, so that full brake lever travel may be had without overtaxing or jamming the valve and its associated linkage. Therefore, the operator need not, especially in an emergency, give any thought to power deceleration if, through brake application, reduced vehicle speed or travel is desired. It will thus be seen that I combine the brake mechanism with the carburetor mechanism in such manner as to secure automatic and simultaneous power control and vehicle motion.

During normal driving, the operator's foot is positioned with the heel located in the vicinity of the pivotal connection 94, while the ball of the foot is located substantially about the end of the reach 100. In ordinary driving, acceleration or deceleration is secured through manipulation of the pedal 96 by the heel. Thus the pedal 96 is pivoted about the axis 98 during normal acceleration or deceleration. To operate the brake mechanism, the brake lever 28 is depressed by exerting pressure with the ball of the foot on pedal 96. Immediately upon movement of the lever 28, the cam edge 184 pivots the bell crank 28 for unlatching the arm 42 from the latch arm 18 so as to permit the spring 64 to close the valve 34. Normal acceleration or deceleration again may be had by releasing pressure on the brake lever 28 to permit its return to the position of Fig. 1.

In Figs. 10 to 16 inclusive, I illustrate a modified form of my invention. According to Figs. 10 and 11, I make use of a brake lever 190 corresponding to the brake lever 28. This lever includes a reach 192 which is pivotally connected at 194 with a foot pedal 196 pivotally connected at its lower end with the accelerator linkage 198, as at 200. Linkage 198 is identical with that illustrated at 86 in Fig. 1. Linkage 198 is connected with the bell crank 202, which in turn is connected with a rod 204 connected with the arm 206 which is loosely mounted on the shaft 208 to which the throttle valve 210 is fixedly connected. The parts so far described are identical with the structure of the corresponding parts in Figs. 1 to 9 inclusive.

The structure of Figs. 10 to 16 inclusive differs in that I provide electrically operated means for breaking the connection between foot operated pedal and the throttle valve 210 upon initiation of brake application. Shaft 208 is provided with an enlarged extension 212 which constitutes a core in the electromagnet 214. The core 212 includes spaced bar-like members 216 between which I position a latch lever 218 which is pivotally connected to the members 216, as at 220. One end of the lever is connected with one end of a tension spring 222 connected at its other end with a lug. To the outer face of the segment 226 I pivotally connect the latch lever 218, as at 228.

A screw 230 is rotatably related to an ear 232 fixedly connected with the segment 226. Screw 230 is restrained from relative longitudinal movement with respect to the ear 232. One end of the latch lever 218 is provided with a threaded bore 234 having threaded relation with the screw 230 so that the segment 226 may be adjusted about its axis 228 so as to secure precise relation between the segment and the arm 206.

Fig. 12 illustrates the latch lever 218 as having butting relation with a screw at 236 to resist further pivotal movement in one direction. The end 238 of the flange 240 normally extends across the upper edge of the arm 206. Upward movement of the rod 204 will move the valve 210 toward an open position through the medium of the segment 226 and the latch lever 218. In this respect, the structure of Figs. 10 to 16 inclusive is similar to that illustrated in Figs. 1 to 9 inclusive.

Electromagnet 214 is provided with the usual winding 242 and a casing 244 which encloses the winding. The end wall 246 of the casing is provided with a lug 248 to which I pivotally connect one end of a link 250, the other end of which is pivotally connected at 252 with the latch lever 218. Thus it will be seen that energization of the electromagnet will exert a pull on the core 212, but since the core is restrained from relative longitudinal movement, the casing 244 will be drawn in the direction of the arrow 254. Such movement of the casing will pivot the latch lever 218 about its axis 220 for moving the end 238 of the segment 226 out of holding relation with the arm 206. Thus the arm 206 is unlatched to function in the same manner as the arm 42 of Figs. 1 to 9 inclusive.

Casing 244 is provided with external threads 256 for connection with a cover plate 258. The cover plate is provided with a central opening 260 for the reception of a plug 262 threaded into the sleeve 264, as at 266. Core 212 is provided with a rod 268 which extends loosely through the bore 270 in the plug 262 to serve as an anchor for one end of a tension spring 274 having its other end fixedly connected at 276 with the plug 262. Spring 274 exerts a pull on the casing 244 in the direction of the arrow 278 for holding the segment 226 in latching relation with the arm 206. Movement of the casing 244 in the direction of arrow 254 is against the tension of the spring 274. Closing of the circuit through the electromagnet 214 is accomplished through manipulation of the brake lever 190.

In Fig. 10, I illustrate the electromagnetic switch 280 as being mounted on the foot board 282. Switch 280 comprises a casing 283 for enclosing a body 284 provided with a slot 286 through which the reach 192 and the brake lever 190 loosely extend. The body 284 is provided with a recess 288 in its upper side for housing a rotary switch element 290 of insulating material. Switch element 290 is provided with a central bore 292 for the reception of a bolt 294 embedded into the body 284. Switch element 290 is rotatable on the screw 294.

Between the head 296 of the bolt 294 and the switch element 290 I position a spring washer 298 which presses the switch element against the face 300 of the recess 288. Thus the switch element 290 is fixedly restrained against accidental movement about the screw 294.

Referring to Fig. 14, the switch element 290 is recessed at 302 for the reception of a contact block 304 fixedly related to the switch element by a screw 306. The switch element is also provided with a peripheral recess 308 for accommodating a contact pin 310 fixedly related to the brake lever 190. The switch element 290 is also provided with a recess 312 so arranged as to provide a finger 314. Finger 314 is normally positioned between the contact pin 310 and a second pin 316 spaced from the first pin. Fig. 14 illustrates the relative relation between the parts when the brake lever 190 is in its normal nonbraking position of Fig. 10.

In Fig. 16, I illustrate a wire 318 as being electrically connected with the contact block 304, as at 320. Wire 318 is connected with the winding 242, which winding is connected with a second wire 322 leading to a source of current 324, such as a battery, grounded at 326. Reach 192 of the brake lever is grounded, as at 328.

Pressure on the pedal 196 pivots the brake lever 190. A slight movement of the brake lever brings the contact pin 310 into pressure relation with the contact segment 304 for closing the circuit through the electromagnet 214 for bringing the segment 226 out of latching relation with the arm 206. Thus the arm 206 may be elevated about the shaft 208 as an axis. At the same time, the spring 222 will move the valve 210 to its closed position through the medium of the latch lever 218.

To the end that the conducting relation between the pin 310 and the contact segment 304 may be of short duration, the pin 316 will engage the finger 314 to augment rotation of the switch element 290. Such engagement will rotate the segment contact 304 out of conducting relation with the pin 310 for breaking the circuit through the electromagnet 214, thus permitting normal valve action to be resumed, if desired.

Switch element 290 is frictioned locked and will not rotate of its own accord. The switch element 290 is rotated by the pins 310 and 316 only. Being frictioned locked, it remains in a more or less extreme open position until release of pressure from the foot pedal 196. As the brake lever 190 moves toward its normal position, the non-conductive pin 216 will engage the face 318 for rotating the switch element 290 to the position where the pin 310 will engage the finger 314 and rotate the switch element to the normal position of Fig. 14.

To maintain a semi-fixed, nonbraking position of the brake lever 190, the body 284 is provided with a bore 320 for loosely receiving a latch ball 322. Reach 192 of the brake lever is provided with a recess 324 within which the ball 322 lies in a normal position of the brake lever. The body 284 may be provided with a detachable closure plate 326 secured in position by screws 328. Plate 326 is provided with an adjusting screw 330 provided with a disc 332 fitting loosely in the bore 320. Between the ball 322 and the disc 332 I interpose a compression spring 334 which urges the ball 322 into the recess 324 for yieldingly supporting the brake lever in its normal or non-braking position. Tension of the spring 334 may be changed through the medium of the adjusting screw 330.

My invention functions to reduce the hazards incident to the operation of automotive vehicles. Through the medium of the two-fold functional characteristics of the pedal 196, I greatly reduce the time lapse between observed emergency and stoppage of the vehicle. The construction is such as to eliminate the otherwise time lapse necessary for the operator to shift his foot from the accelerator pedal to a more or less effective braking position upon the conventional brake pedal.

Thus, in an emergency, the operator is required to make but one short, natural thrust forward on the pedal 196, which thrust brings about deceleration of the vehicle, in addition to brake application thereof. To decelerate or reduce applied power and apply effective braking pressure in conventional systems, it is necessary that the driver lift his foot upward, move it over and place it on the foot pedal of the brake lever and then push forward until the desired braking effect is accomplished. All these movements are more or less confusing and time consuming. Such confusion and time loss are entirely eliminated through the medium of my invention. One short forward push of the driver's foot is all that is necessary to bring about deceleration and brake application. This permits brake application instantaneously with the mental reaction response.

I claim:

1. In an engine, the combination of a throttle valve including means for urging the valve to closed position, a brake lever including a pedal pivoted thereto for actuating the brake lever, an operating linkage between the pedal and said throttle valve including an electromagnet coupling, and switch means including an electric circuit for the electromagnet coupling controlled through initial actuation of the brake lever for energizing the electromagnet coupling, to uncouple the linkage and permit said first means to move the valve to a closed position.

2. In an engine, the combination of a brake lever, a valve, a pedal pivoted at one end on said brake lever, an operating linkage connected with said valve and pivotally connected with said pedal at its opposite end, and electrically operated means controlled through initial movement of said brake lever for uncoupling said operating connection.

3. In an engine, the combination of a throttle valve including means for urging the valve to closed position, a brake lever including a pedal pivotally connected therewith for actuating the same, an operating linkage connected with the throttle valve and pivotally connected with the pedal, and electrically operated means controlled through initial movement of the brake lever for uncoupling said operating connection, to permit said first means to move the throttle valve to a closed position.

4. In an engine, the combination of a throttle valve including means for urging the valve to closed position, a brake lever including a pedal pivoted thereto for actuating the brake lever, an operating linkage between the pedal and said throttle valve including an electromagnet coupling, and a latch means in said linkage to be unlatched through initial actuation of the brake lever for uncoupling the linkage and permitting the valve to move to a closed position.

5. In a device of the type described, the combination of a valve having a shaft rotatably journaled in a support, an arm pivotally mounted on said shaft, a latch lever means pivoted to said shaft for rotating the latter to actuate said valve, said latch lever means including an abutment extending transversely of said arm, resilient means acting on said latch lever means for holding said abutment in engagement with said arm and for moving the valve to a closed position when said latch lever means is pivoted in a given direction for moving the abutment in the clear of said arm, a brake lever having a foot operated pedal, said pedal being pivotally connected with said brake lever, a linkage having an operating connection with said pedal and with said arm for moving said valve to an open position, and means controlled by initial actuation of said brake lever for shifting the latch lever means to move said abutment in the clear of said arm to permit said valve to close as the brake lever is moved in a brake applying direction.

6. In a device of the type described, the combination of a valve having a shaft rotatably journaled in a support, an arm pivotally mounted on said shaft, a latch lever means pivoted to said shaft for rotating the latter to actuate said valve, said latch lever means including an abutment extending transversely of said arm, resilient means acting on said latch lever means for holding said abutment in engagement with said arm and for moving the valve to a closed position when said latch lever means is pivoted in a given direction for moving the abutment in the clear of said arm, a brake lever having a foot operated pedal, said pedal being pivotally connected with said brake lever, a linkage having an operating connection with said pedal and with said arm for moving said valve to an open position, a cam on said brake lever, and a linkage operatively connected with said latch lever means and actuated by said cam through initial movement of the brake lever for shifting said latch lever means to move said abutment in the clear of said arm to permit said valve to close as the brake lever is moved in a brake applying position.

7. In a device of the type described, the combination of a first operated means including a rotative shaft, a second operated means, a pedal connected with said second operated means for actuating the same, an arm pivoted on said shaft, a latch lever means pivotally connected with said shaft and arranged to rotate the latter, said latch lever means including an abutment extending across said arm and a spring acting on the latch lever means for moving said first operated means to a predetermined position, an operating connection between said pedal and said arm for moving said first operated means in a predetermined direction, and means controlled through initial actuation of said second operated means for moving said latch lever means about its axis for bringing said abutment in the clear of said arm for rendering said operating connection inoperable for actuating said first operated means.

8. In a device of the type described, the combination of a first operated means including a rotative shaft, a second operated means, a pedal connected with said second operated means for actuating the same, an arm pivoted on said shaft, a latch lever means pivotally connected with said shaft and arranged to rotate the latter, said latch lever means including an abutment extending across said arm and a spring acting on the latch lever means for moving said first operated means to a predetermined position, an operating connection between said pedal and said arm for moving said first operated means in a predetermined direction, a linkage operatively connected with said latch lever means, and cam means associated with said second operated means for actuating said linkage upon initial movement of said second operated means to move the latch lever means about its axis to bring said abutment in the clear of said arm for rendering said operating connection inoperable for actuating said first operated means.

STANLEY E. ANDERSON.